P. T. VANNICE.
BLACKBOARD RUBBER.
No. 187,682. Patented Feb. 20, 1877.
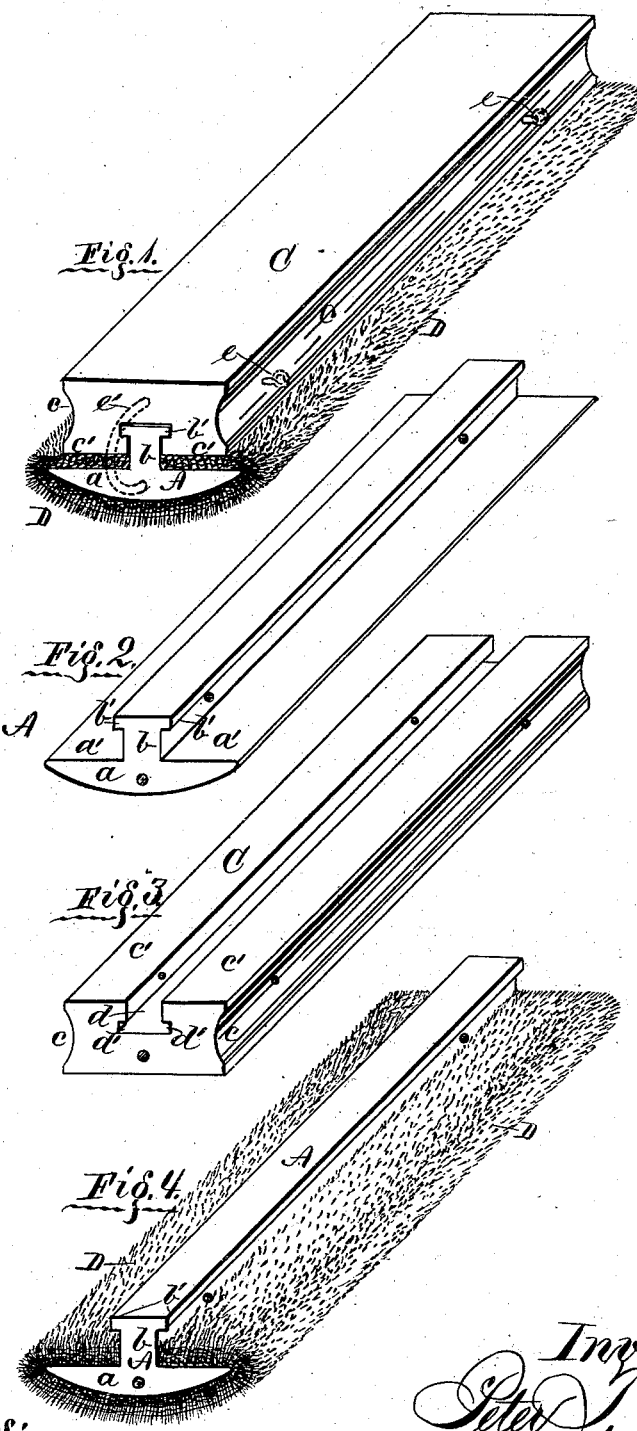

UNITED STATES PATENT OFFICE.

PETER T. VANNICE, OF GALESBURG, ILLINOIS.

IMPROVEMENT IN BLACKBOARD-RUBBERS.

Specification forming part of Letters Patent No. 187,682, dated February 20, 1877; application filed May 24, 1876.

*To all whom it may concern:*

Be it known that I, PETER T. VANNICE, of Galesburg, in the county of Knox and State of Illinois, have invented certain new and useful Improvements in Blackboard-Rubbers; and I do hereby declare that the following is a full, clear, and exact description thereof, which will enable others skilled in the art to which it appertains to make and use the same, reference being had to the accompanying drawings, and to letters of reference marked thereon, which form a part of this specification.

The object of my invention is to provide a rubber for removing markings from blackboards and other similar surfaces—a rubber in which two blocks are so constructed and united as to hold securely the edges or sides of a strip or piece of suitable rubbing material, while its central and main portion is folded upon one of the blocks, for use as a rubber, and to hold it without special preparation of the strip for the purpose; and the invention consists in a peculiar construction and combination of the blocks, imparting to them adaptation to holding securely an unprepared plain strip of rubbing material, all as hereinafter more fully described.

In the accompanying drawings, Figure 1 is a perspective view of a blackboard-rubber embodying my invention. Fig. 2 is a detail perspective view, showing the base-block, upon which the rubbing material is folded. Fig. 3 is a detail perspective view of the cap-block. Fig. 4 is a detail perspective view of the base-block and the rubber folded thereon.

Referring to the parts by letters, A is the base-block, the lower part of which is formed, as shown in the drawings, with a broad base, $a$, having its lower side either flat or convex, and its upper side $a'$ flat, and with a T-shaped tenon having a web, $b$, and side flanges $b'$ rising centrally and longitudinally therefrom. C is the cap-block, its sides $c$ grooved so that it may be grasped by the hand of the operator as a hand-hold in using it upon a blackboard. Its lower side $c'$ is broad and flat, corresponding with the upper surface $a'$ of the block A, and is provided with a central longitudinal groove, $d\ d'$, corresponding with the T-tenon $b\ b'$. D is the rubber proper, formed of a plain strip or piece, of any suitable material, just as it is cut from the piece, and without expensive preparation of any kind.

The strip D being folded upon the block A, as more plainly shown at Fig. 4, the cap C may be placed, by an endwise movement, in the position shown at Fig. 1; in this position the strip D will be securely held in place between the flat surfaces $c'$ and $a'$ of the upper and lower blocks, respectively, the side $d$ of the groove resting against the web $b$ of the tenon, and preventing lateral displacement of the blocks, and the head $b'$ of the tenon resting in the lateral grooves $d'$, and binding the rubbing-strip D between the flat surfaces $a'\ c'$.

The blocks A and C may be separated in the obvious manner for the removal and renewal of the rubber D.

The dotted lines $e\ e'$ show a modification, in which the flanges $b'$ may be dispensed with, and the blocks united by the insertion of transverse pins $e$ or end staples $e'$.

I am aware that Letters Patent were granted to C. J. Higgins March 17, 1874, for improvements in blackboard-rubbers; and I do not wish to be understood as claiming the device therein shown and described.

What I claim as new, and desire to secure by Letters Patent, is—

The combination of the strip or flat piece of rubbing material D with blocks A and C, united by a T-shaped tenon, and having the binding-surfaces $a'\ c'$, substantially as described, and for the purpose specified.

In testimony that I claim the foregoing as my own I affix my signature in presence of two witnesses.

PETER T. VANNICE.

Witnesses:
 W. B. RICHARDS,
 THOMAS MCKEE.